United States Patent
Macaudiere

[19]
[11] Patent Number: 6,093,340
[45] Date of Patent: *Jul. 25, 2000

[54] USE OF MIXTURES BASED ON DIFLUOROMETHANE AND ON PENTAFLUORETHANE AS CRYOGENIC FLUIDS IN VERY LOW TEMPERATURE REFRIGERATION

[75] Inventor: Sylvie Macaudiere, Asnieres, France

[73] Assignee: Elf Atochem S.A., France

[*] Notice: This patent issued on a continued prosecution application filed under 37 CFR 1.53(d), and is subject to the twenty year patent term provisions of 35 U.S.C. 154(a)(2).

[21] Appl. No.: 08/979,795

[22] Filed: Nov. 26, 1997

[30] Foreign Application Priority Data

Nov. 27, 1996 [FR] France ................................ 96 14545

[51] Int. Cl.$^7$ ........................................... C09K 5/04
[52] U.S. Cl. .................................. 252/67; 62/114
[58] Field of Search ................... 252/67; 62/114

[56] References Cited

U.S. PATENT DOCUMENTS

| | | | |
|---|---|---|---|
| 4,978,467 | 12/1990 | Shankland et al. | 252/69 |
| 5,185,094 | 2/1993 | Shiflett | 252/67 |
| 5,403,504 | 4/1995 | Bivens et al. | 252/67 |
| 5,643,492 | 7/1997 | Shiflett | 252/67 |
| 5,736,063 | 4/1998 | Richard et al. | 252/67 |
| 5,788,877 | 8/1998 | Shiflett | 252/67 |

FOREIGN PATENT DOCUMENTS

| | | |
|---|---|---|
| 0451692 | 10/1991 | European Pat. Off. . |
| 0 583 179 | 2/1994 | European Pat. Off. . |
| 92/11338 | 7/1992 | WIPO . |
| 93/18110 | 9/1993 | WIPO . |
| 94/11459 | 5/1994 | WIPO . |

OTHER PUBLICATIONS

Doering et al, "Thermodynamic properties of closely boiling mixtures of R32 and R125", DKV–Tagungsber, pp. 211,230, no month available, 1995.

Chemical Abstracts 125:145954, "Thermodynamic properties of closely boiling mixtures of R32 and R125", Doering et al., no month available, 1995.

Chemical Abstracts 123:203857, "Assessing Halon alternatives for aircraft engine nacelle fire suppression", Grosshandler et al., no month available, 1995.

Primary Examiner—Christine Skane

[57] ABSTRACT

To replace bromotrifluoromethane (R-13B1) in very low temperature refrigeration, the invention proposes to employ a mixture containing, on a mass basis, 25 to 50% of difluoromethane and 50 to 75% of pentafluoroethane.

A third component may be incorporated in this mixture.

6 Claims, 3 Drawing Sheets

USE OF MIXTURES BASED ON DIFLUOROMETHANE AND ON PENTAFLUORETHANE AS CRYOGENIC FLUIDS IN VERY LOW TEMPERATURE REFRIGERATION

FIELD OF THE INVENTION

The present invention relates to the field of refrigeration and its subject-matter is more particularly the use of mixtures of cryogenic fluids of low boiling point which have no or little effect on the environment, in order to replace bromofluorocarbons (BCF) in very low temperature refrigeration systems (evaporation temperature lower than −45° C.).

BACKGROUND OF THE INVENTION

Chlorofluorocarbons (CFC) or hydrochlorofluorocarbons (HCFC) were widely employed in the field of low and very low temperature. Thus, R-22 (chlorodifluoromethane) and R-502 (azeotrope of chlorodifluoromethane and chloropentafluoroethane) with single- or two-stage systems made it possible to reach temperatures ranging down to −35° C., while R-13 (chlorotrifluoromethane) and R-503 (azeotrope of trifluoromethane and chlorotrifluoromethane) with cascade systems (with two compressors) made it possible to go down to −80° C.

In these cases, by virtue of thermodynamic properties close to those of the CFCs, hydrofluorocarbons (HFC) such as HFC-23 (trifluoromethane), HFC-116 (hexafluoroethane), HFC-32 (difluoromethane), HFC-125 (pentafluoroethane), HFC-143a (1,1,1-trifluoroethane) and HFC-134a (1,1,1,2-tetrafluoroethane), pure or mixed, have enabled substitutes to be developed.

However, a fluid had been developed in the past for making the transition between the above two configurations. This is a bromofluorocarbon (BFC), namely bromotrifluoromethane (R-13B1) which made it possible, with a single compressor, to obtain temperatures of −60° C. with a single- or two-stage system.

Like the CFCs, R-13B1 has been subjected to rules by the Montreal Protocol because of its large effect on ozone, and its production has been prohibited since Jan. 1, 1996.

Among the HFCs available at present none exhibits properties close to those of R-13B1, as the table below shows. In particular, none has a boiling point close to that of R-13B1, which would make it possible to go down to temperatures close to −60° C.:

TABLE 1

| | Boiling T (° C.) | Critical T (° C.) | ΔHv at 1 atm (kJ/kg) | Vapour d at 1 atm (kg/m$^3$) | Liquid d at 25° C. (kg/dm$^3$) | Pressure at 25° C. (bar) |
|---|---|---|---|---|---|---|
| R-13B1 | −57.7 | 67 | 119 | 8.72 | 1.538 | 16.2 |
| HFC-23 | −82.1 | 25.9 | 238.6 | 4.68 | — | — |
| HFC-116 | −78.3 | 19.7 | 117.7 | 9.00 | — | — |
| HFC-32 | −51.7 | 78.4 | 381.5 | 2.98 | 0.961 | 16.9 |
| HFC-125 | −48.1 | 66.3 | 169.7 | 6.73 | 1.189 | 13.8 |
| HFC-143a | −47.4 | 72.9 | 220.2 | 4.88 | 0.927 | 12.6 |
| HFC-134a | −26.4 | 101.1 | 215.9 | 5.28 | 1.206 | 6.7 |
| HFC-218 | −36.7 | 71.9 | 104.4 | 10.25 | 1.323 | 8.8 |
| HFC-290 | −41.6 | 96.7 | 427.8 | 2.40 | 0.494 | 9.3 |

HFC-116 is the fluid nearest to R-13B1, but its critical point, which is too low (<20° C.), does not allow it to be employed in mono-stage systems with a condensation temperature higher than 30° C.

In the case of the other HFCs, which have higher critical temperatures, their thermodynamic properties and, in some cases, their flammability mean that no pure substance can replace R-13B1.

DESCRIPTION OF THE INVENTION

The objective of the present invention is therefore to provide a solution to the replacement of R-13B1 by means of mixtures of low boiling point which are nonflammable, containing at least two hydrofluorocarbons.

It has now been found that mixtures containing, on a mass basis, 50 to 75% of HFC-125 and 25 to 50% of HFC-32 are substitutes capable of replacing R-13B1.

The preferred mixtures are those which contain, on a mass basis, from 65 to 75% of HFC-125 and 25 to 35% of HFC-32. Among the mixtures according to the invention a very particularly preferred mixture contains approximately 68% of HFC-125 and 32% of HFC-32.

BRIEF DESCRIPTION OF THE DRAWINGS

For the replacement of R-13B1 the boiling point is a very important criterion. Inspection of FIG. 1, appended, which gives the boiling temperature of 32/125 mixtures at 1 atm as a function of the content of HFC 32 shows that the 32/125 mixtures according to the invention make it possible to obtain a boiling point lower than −51° C., and therefore fairly close to that of R-13B1.

It is seen that, in the case of HFC-32 contents higher than 20%, the boiling temperature remains stable (difference smaller than 1 K).

Furthermore, the measurements of flammability of 32/125 mixtures at various temperatures (25 and 100° C.) at atmospheric pressure according to ASTM Standard E 681–85 show that the mixtures are nonflammable in the case of HFC-32 contents lower than 50%.

The HFC-32/125 mixtures according to the invention are quasi-azeotropic mixtures, that is to say that they exhibit a small difference in pressure between the bubble and dew points (<1%) and that they have a vapour pressure very close to that of R-13B1.

The data for a mixture containing, on a mass basis, approximately 68% of HFC-125 and 32% of HFC-32 are collated in Table II.

TABLE II

| Temperature (° C.) | R-13B1 pressure (bar) | Pressure (bar) of the 32/125 mixture | | |
|---|---|---|---|---|
| | | Bubble | Dew | Difference |
| −60° C. | 0.908 | 0.656 | 0.651 | 0.005 |
| −40° C. | 2.198 | 1.750 | 1.734 | 0.016 |
| −20° C. | 4.566 | 3.935 | 3.900 | 0.035 |
| 0° C. | 8.452 | 7.794 | 7.725 | 0.069 |
| 20° C. | 14.344 | 14.017 | 13.899 | 0.118 |
| 40° C. | 22.826 | 23.392 | 23.221 | 0.171 |

Figure 1:
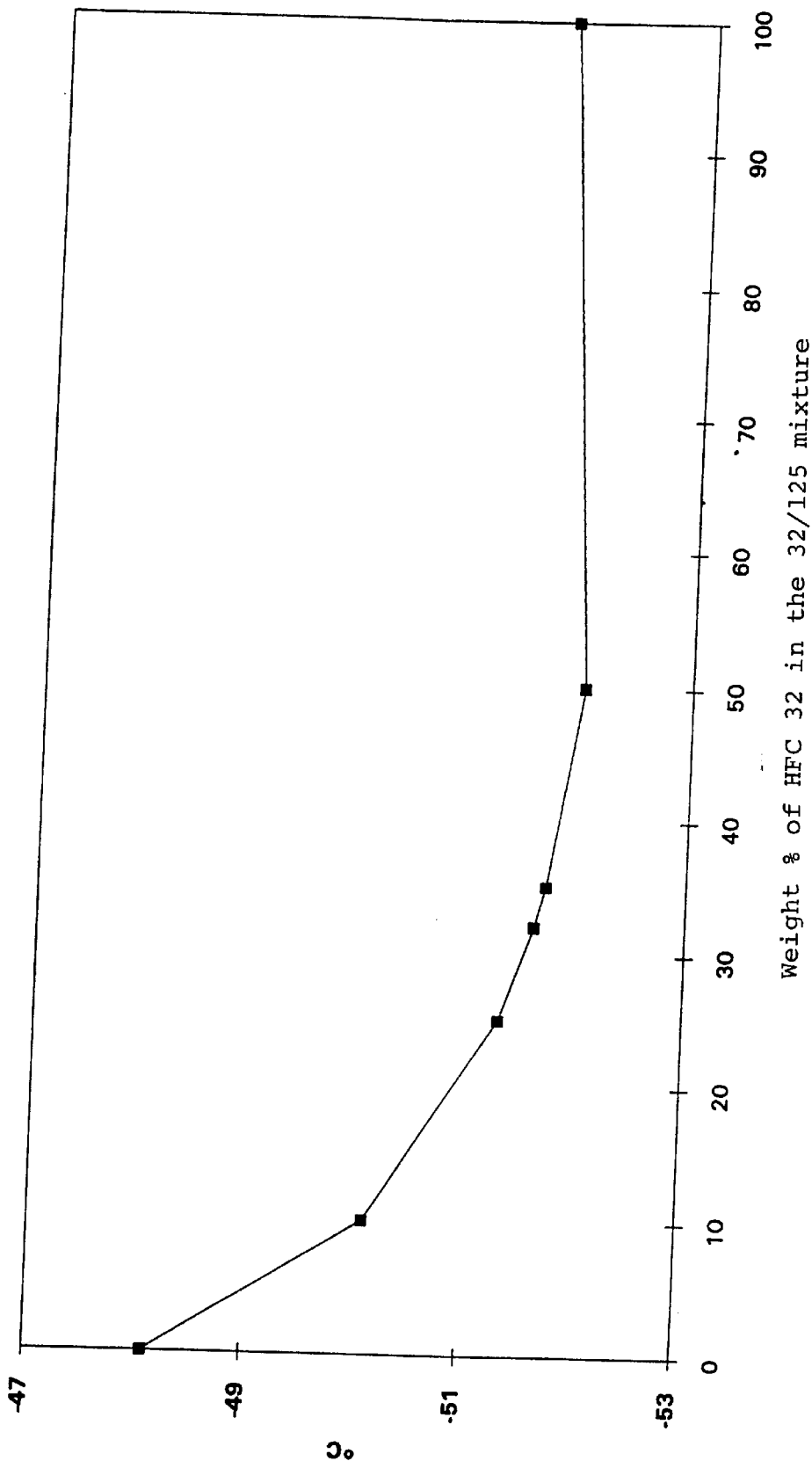
Figure 2:
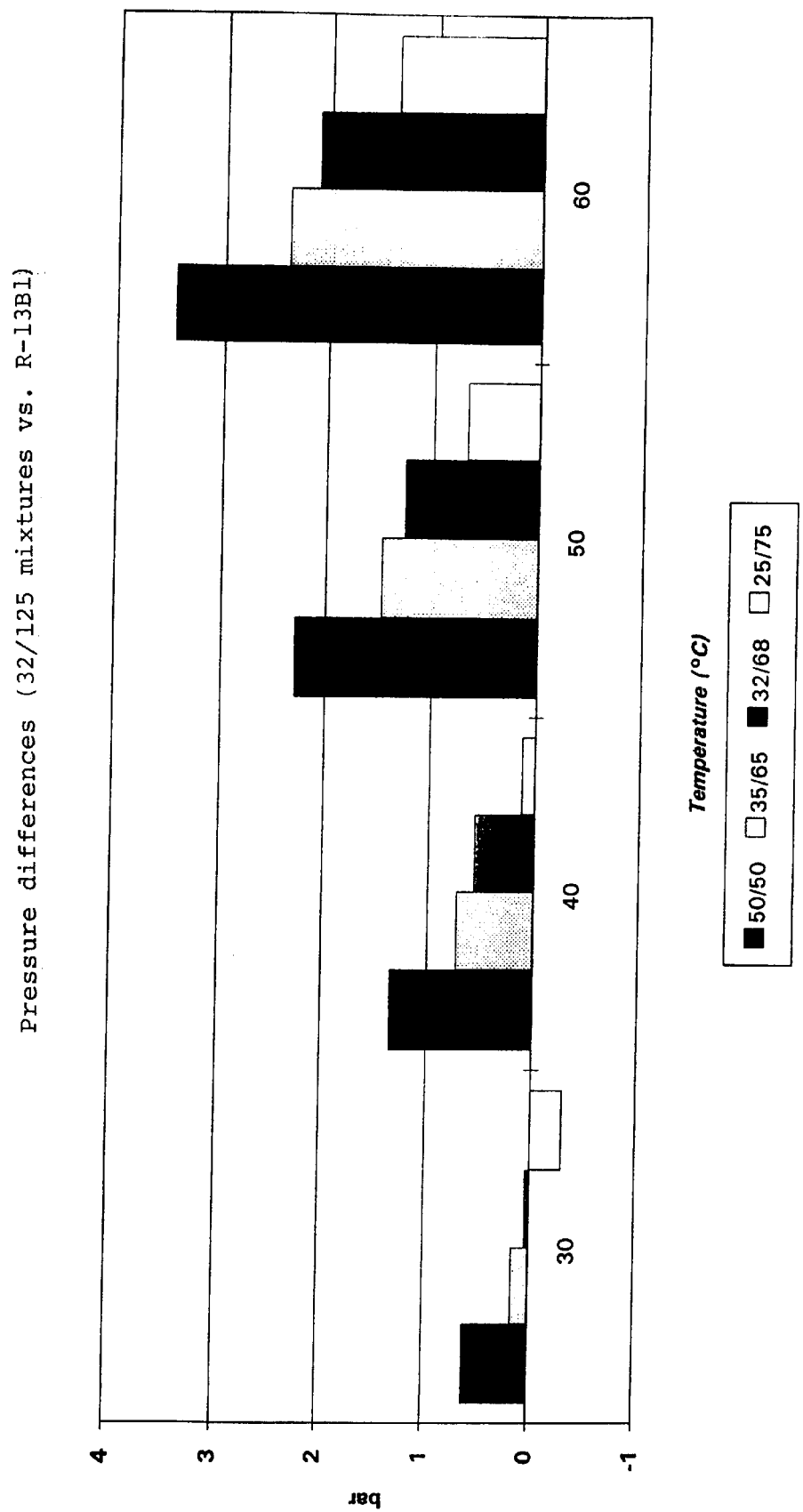

The data at 40° C. for 32/125 mixtures of various compositions are collated in Table III, and FIG. 2 shows the pressure differences with R-13B1 at various temperatures.

TABLE III

| 32/125 Mixture weight % | Bubble pressure (bar) |
|---|---|
| 50/50 | 24.17 |
| 35/65 | 23.55 |
| 32/68 | 23.39 |
| 30/70 | 23.27 |
| 25/75 | 22.95 |
| R-13B1 | 22.83 |

The vapour pressure at high temperature is an important factor for a cryogenic plant. In fact, in air condensation systems the condensation temperatures can reach 40 to 50° C. However, the existing hardware has been designed for pressures corresponding to those of R-13B1. In these conditions an excessive increase in pressure is not acceptable by the system. The mixtures according to the invention, containing 25 to 50% by weight of HFC-32, make it possible to obtain a low boiling point without giving rise to excessively large delivery pressures.

It has furthermore been found that it is possible to add one or two compounds cited in Table I to the 32/125 binary mixtures. In particular, HFC-23 and HFC-143a can be cited, thus forming ternary mixtures for the same application. Table IV below shows that the addition of a third component (X) such as HFC-23 or HFC-143a to the 32/125 mixtures makes it possible to obtain boiling points which are closer still to that of R-13B1 (E=−57.7° C.).

TABLE IV

| | EXAMPLES | |
|---|---|---|
| | HFC-32/HFC-125/X mixture | Boiling |
| X | Weight % | temperature (° C.) |
| HFC-23 | 25/63/12 | −59.5 |
| " | 30/65/5 | −55.1 |
| " | 40/52/8 | −56.5 |
| " | 31.5/58.5/10 | −57.9 |
| HFC-143a | 22.5/67.5/10 | −51.1 |
| " | 45/45/10 | −52.1 |
| " | 31.5/58.5/10 | −51.6 |
| " | 20/60/20 | −50.9 |
| " | 40/40/20 | −52.1 |

The following examples illustrate the invention without limiting it.

EXAMPLE 1

The results presented below were obtained on a cryothermostat designed to run on R-13B1.

After a base line was obtained with the latter, 32/125 and 32/125/23 mixtures according to the invention were tested on this equipment.

The only changes introduced when the fluid was changed were an adjustment to the expansion valve and an optimization of the charge of cryogenic fluid.

If the liquid and vapour densities of the mixtures according to the invention are compared in relation to R-13B1, a decrease of 55 to 65% in the density of the vapour drawn in by the compressor and a decrease of approximately 30% in the liquid density are observed in all cases. It is therefore appropriate to load the plant with a charge approximately 50% smaller than that of R-13B1 and to close the expansion valve until the evaporator is fed correctly.

To give an example, optimization results produced with a 32/125/23 mixture containing 26/63/11% by weight are given in Table V. The trial consists in lowering the temperature of the refrigerant bath. The bath temperature and the high and low pressures were measured throughout the trial period.

Figure 3:
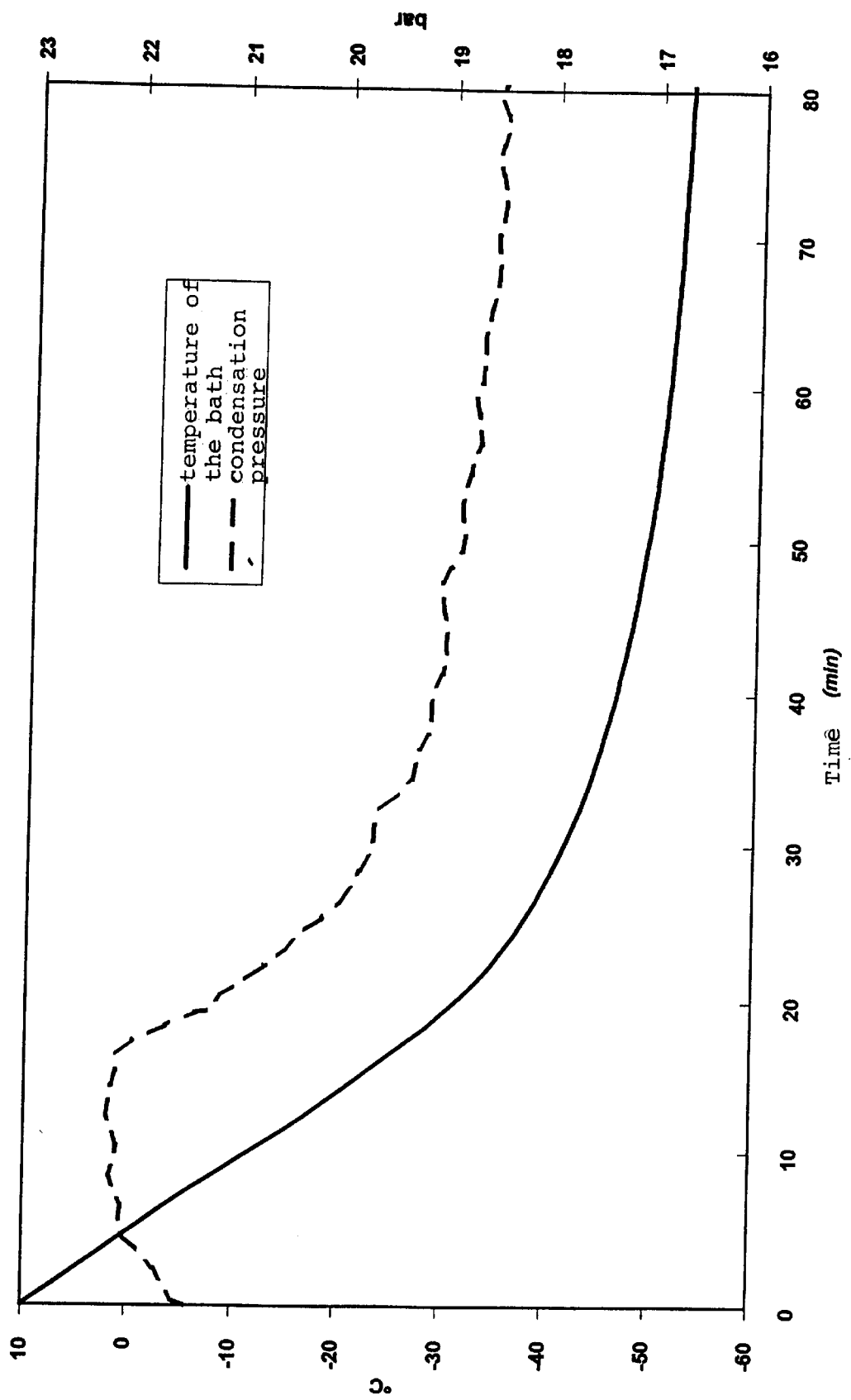

As shown in FIG. 3, appended, which illustrates the change in the temperature of the bath and in the condensation pressure as a function of time, two stages of operation are observed. The first stage (down to approximately −30° C.) is performed at constant rate of cooling and pressure.

TABLE V

| | | | Stage A | | | Stage B Final point of the trial | |
|---|---|---|---|---|---|---|---|
| | | | | Pressure | Bath | Low | Temperature of the |
| Charge (g) | Expansion valve* | Rate (° C./min) | High (bar) | Low (bar) | temperature (° C.) | pressure (bar) | vapour drawn in (° C.) |
| 615 | Open | 2.6 | 22 | 1.9 | −51 | 1.05 | −39.5 |
| 615 | Closed | 2 | 21.4 | 1.5 | −54.2 | 0.67 | 2.7 |
| 922 | Closed | 2.1 | 22.1 | 1.6 | −53.4 | | |
| 1230 | Closed | 2.1 | 24 | 1.6 | −52.8 | | |

*Open expansion valve means that the setting initially made for R-13B1 has not been altered. Closed expansion valve means that the valve of the expansion device was closed again in relation to the initial setting.

In the case of the expansion valve set for R-13B1 a low pressure which is too high and a temperature of the vapour at the compressor suction which is too low are observed, thus indicating an excessive feed of the evaporator.

Conversely, if the plant is loaded with the same charge as that of R-13B1 (namely 1.2 kg), an increase in the high pressure is observed, indicating an excessively fed condenser.

EXAMPLE 2

Thermodynamic performance of various mixtures according to the invention, compared with R-13B1, was tested on a cryothermostat without any major alteration to the system apart from the optimization of the charge of cryogenic fluid and the closure of the expansion valve.

Table VI summarizes the thermodynamic performance seen during an attempt to lower the temperature of the refrigerant bath with R-13B1 and with various mixtures of HFC-32, HFC-125 and HFC-23 at an ambient temperature of 23±1° C.

TABLE VI

| | FLUIDS | | | | |
|---|---|---|---|---|---|
| | R-13B1 | 32/125 (50/50) | 32/125 (32/68) | 32/125/23 (26/63/11) | 32/125/23 (30/65/5) |
| Stage A | | | | | |
| Rate (° C./min) | 1.38 | 2.5 | 2.06 | 2.07 | 1.94 |
| High pressure (bar) | 18 | 20.3 | 18.6 | 22.1 | 20.5 |
| Compressor exit temperature (° C.) | 47 | 62 | 53 | 55 | 56 |
| Power absorbed (W) | 800 | 986 | 860 | 933 | 892 |
| Stage B | | | | | |
| Final temperature of the bath (° C.) | −59 | −54.5 | −54 | −54 | −54 |
| Overall parameters | | | | | |
| Consumption (kWh) | 1.22 | 0.69 | 0.74 | 0.78 | 0.8 |
| Temperature descent period (min) | 122 | 64 | 74 | 73 | 76 |

Stage A corresponds to the stationary stage where the rate of cooling and high pressure are constant: this corresponds to a lowering of the bath temperature from 10 to −30° C.

Stage B corresponds to the lowering of temperature from −30° C. to the final temperature attained.

The mixtures according to the invention make it possible to obtain refrigerant bath temperatures of the order of −54° C. with a single-stage system initially envisaged to operate on R-13B1.

Although having a power absorbed by the compressor which is higher than that of the R-13B1, the mixtures according to the invention permit an overall gain in energy of approximately 40% because of their higher rate of cooling.

The mixtures according to the invention which contain 25 to 50 mass % of HFC-32 and 50 to 75% of HFC-125 and those containing optionally a content lower than 12% of HFC-23 or lower than 20% of HFC-143a allow R-13B1 to be replaced in very low temperature refrigeration systems.

The mixture containing approximately 32 mass % of HFC-32 and 68 mass % of HFC-125 is the best compromise for the replacement of R-13B1.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A method of operating a low temperature refrigeration system having an evaporation temperature of less than −45° C. and designed for R-13B1 comprising formulating a quasi-azeotropic mixture containing, on a mass basis, 25 to 35% of difluoromethane and 65 to 75% of pentafluoroethane as cryogenic fluid, and replacing the R-13B1 with said mixture; wherein said mixture (i) exhibits a difference in pressure between its bubble and dew points of less than one-percent, (ii) has a boiling point of less than −51° C. and (iii) is nonflammable.

2. Method according to claim 1, wherein the mixture contains, on a mass basis, approximately 32% of difluoromethane and 68% of pentafluoroethane.

3. Method according to claim 1, wherein the mixture additionally contains up to 12 mass % of trifluoromethane.

4. Method according to claim 1, wherein the mixture additionally contains up to 20 mass % of 1,1,1-trifluoroethane.

5. A method of operating a low temperature refrigeration system having an evaporation temperature of less than −45° C. and designed for R-13B1 comprising the steps of formulating a quasi-azeotropic mixture consisting essentially of, on a mass basis, (i) 25 to 35% of difluoromethane, (ii) 65 to 75% of pentafluoroethane as cryogenic fluid, and (iii) up to 12% of trifluoromethane or up to 20% of 1,1,1-trifluoroethane; and replacing the R-13B1 with said mixture; wherein said mixture (i) exhibits a difference in pressure between its bubble and dew points of less than one-percent, (ii) has a boiling point of less than −51° C., and (iii) is nonflammable.

6. Method according to claim 5, wherein the mixture contains, on a mass basis, approximately 32% of difluoromethane and 68% of pentafluoroethane.

* * * * *